Aug. 16, 1932.   P. LANE ET AL   1,872,468
WINDSCREEN FOR VEHICLES
Filed June 20, 1928    2 Sheets-Sheet 1
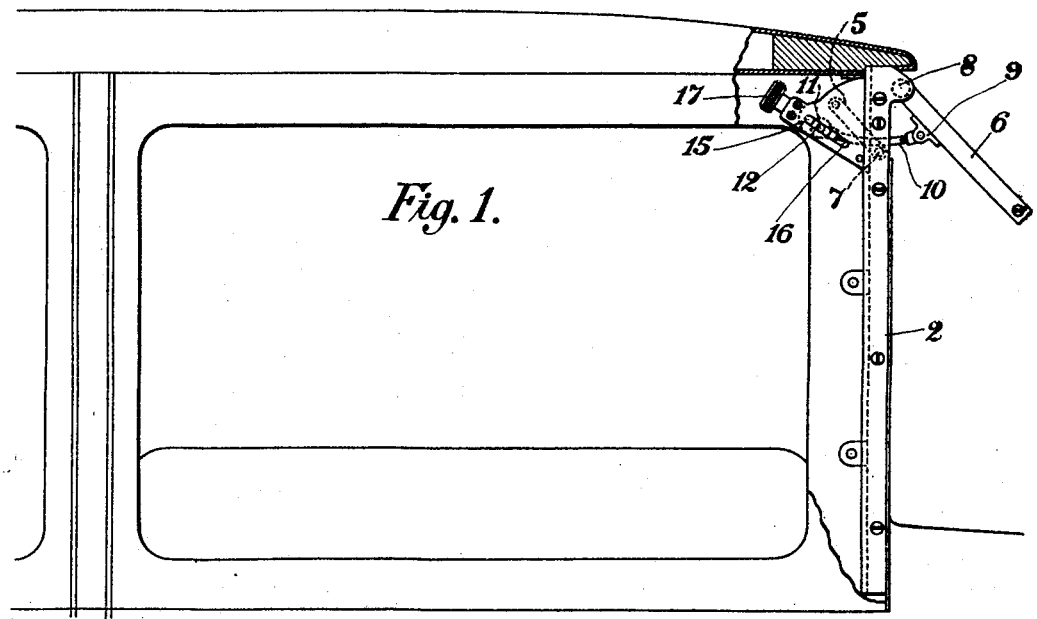
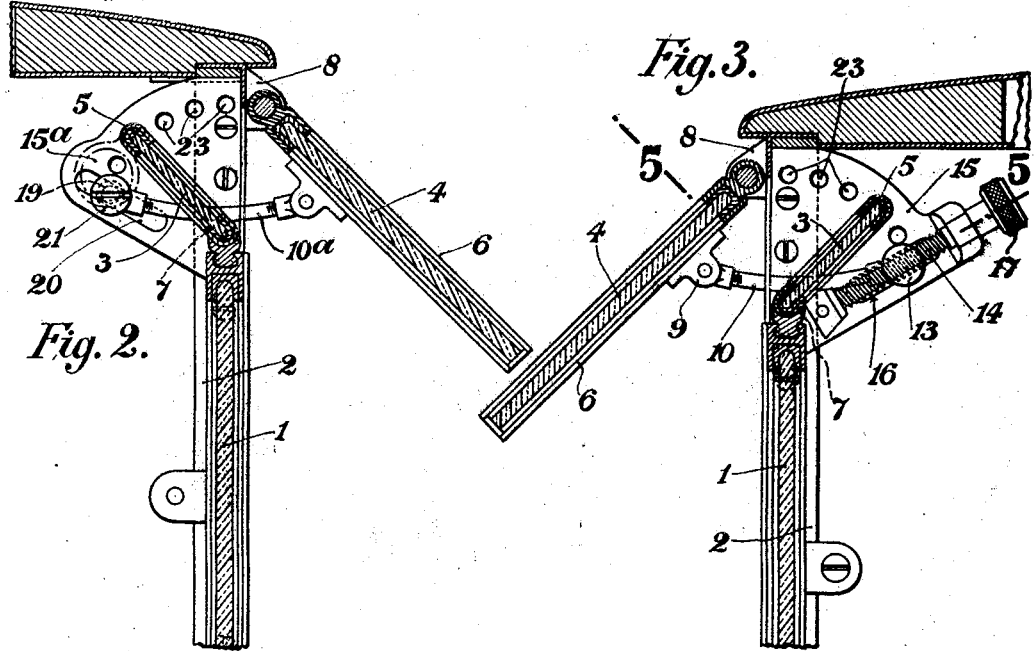
INVENTORS:
Percy Lane and
Arthur Edward Hail,
BY Carr Kan & Gravely,
Their ATTORNEYS.

Aug. 16, 1932.   P. LANE ET AL   1,872,468
WINDSCREEN FOR VEHICLES
Filed June 20, 1928   2 Sheets-Sheet 2

INVENTORS:
Percy Lane and
Arthur Edward Hart,
BY Carr, Carr & Gravely,
Their ATTORNEYS.

Patented Aug. 16, 1932

1,872,468

UNITED STATES PATENT OFFICE

PERCY LANE AND ARTHUR EDWARD LAIT, OF BIRMINGHAM, ENGLAND

WINDSCREEN FOR VEHICLES

Application filed June 20, 1928, Serial No. 286,768, and in Great Britain October 6, 1927.

This invention relates to windscreens for vehicles, particularly motor vehicles of the saloon or all-enclosed type, and the object of the invention is to provide a windscreen of an improved construction.

According to this invention a pair of panels are provided at the upper part of the windscreen, the said panels being inclined, or adapted to be inclined, to provide a ventilation opening between them so that the air passing through the opening into the vehicle is caused to take an upward direction. One or both of the panels may be hinged or pivotally mounted and adapted to be turned angularly so as more or less to close the ventilation opening, when desired. The forward or outer panel may be arranged to constitute a glare-guard or sun-visor, the said outer panel being hinged to the screen frame at its upper edge, and the rear panel being hinged thereto at its lower edge. Means may be provided for retaining the rear panel, which preferably controls the ventilation opening, in different angular positions, and also, if desired, for controlling the inclination of the outer panel or visor from the inside of the vehicle.

Figure 1 of the accompanying drawings represents a side elevation of a windscreen constructed in accordance with this invention, showing the two ventilation panels in their open positions.

Figure 2 is a vertical section through the upper portion of the screen upon a larger scale.

Figure 3 is a vertical section looking in the opposite direction, to show the screw for operating the outer panel from the inside of the vehicle.

Figure 4:
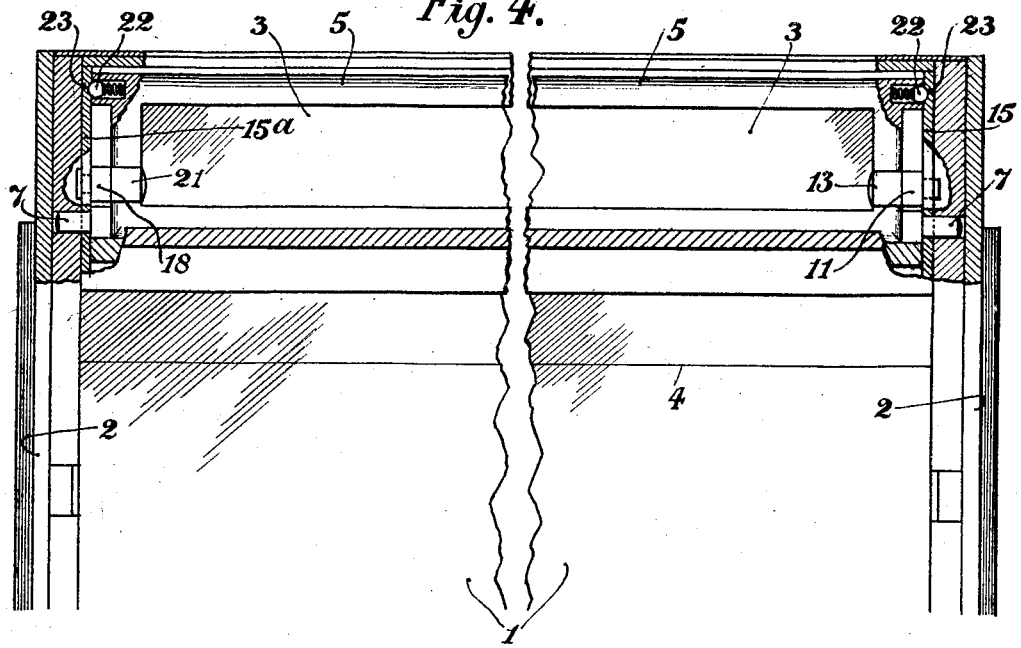
Figure 4 shows a rear view, partly in section, of the rear ventilation panel when closed.

Referring to the drawings, the lower portion of the improved windscreen comprises a single glass panel 1 fixed between the usual side standards 2 of the screen and occupying considerably more than half the total area of the latter. The remaining upper portion of the screen which is unoccupied by the lower panel 1 comprises two comparatively narrow or elongated glass panels 3 and 4, fitted respectively within metal frames 5 and 6 and arranged one immediately in front of the other. These two upper panels are both hingedly attached to the fixed frame or side standards 2 so that they may be opened or closed, the rear panel 3 being pivoted between the standards 2 at its lower edge by means of trunnions 7, whilst the front panel 4, on the other hand, is hinged at its upper edge between forwardly-projecting lugs 8 at the upper ends of the side standards. The arrangement is such that the two panels may be turned angularly in opposite directions, when required, the rear panel 3 turning inwardly about its lower edge and the front panel 4 turning outwardly about its upper edge. The two panels are adapted to be opened or turned angularly in this manner until they are separated by a narrow opening constituting a ventilation aperture through which the air may pass into the interior of the vehicle, the inclination of the lower panel compelling the incoming air to take an upward direction. The front panel 4 in addition to forming a component part of the ventilator, thus provided, is also adapted to serve as a guard or visor for protecting the eyes of the driver from glare due to the rays of the sun, and for this purpose the glass forming the said panel is tinted or stained a suitable colour, such as amber or blue, so that it thus serves to diffuse or partly to obscure the sun's rays; or the glass may be provided with a covering of coloured celluloid or other material.

Figure 5:
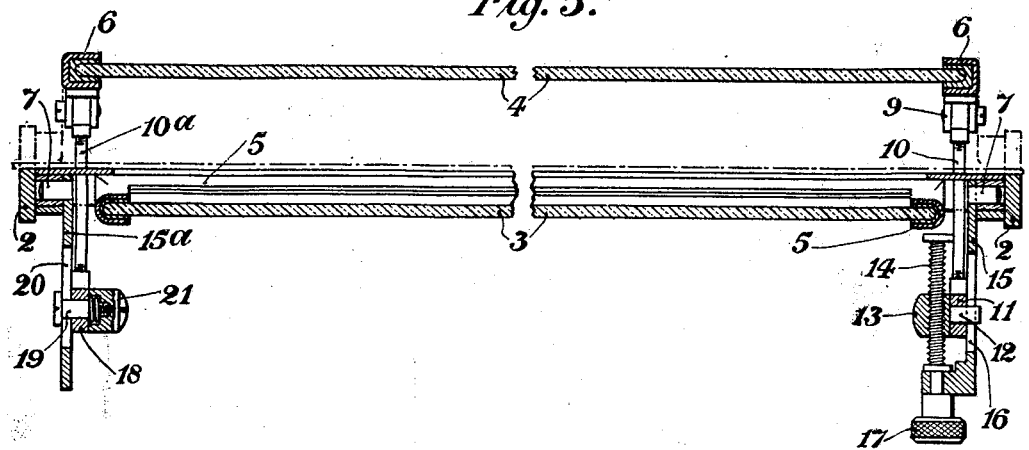
Figure 5 represents a section through the upper part of the screen, on the line 5—5 Figure 3.

Means are provided for opening and closing the said front panel or visor 4 from the interior of the vehicle, and for this purpose it is provided at one end upon its rear face, a short distance below the hinge, with ears 9 (Figures 3 and 5) between which is hinged the forward end of a curved arm or link 10 extending rearwardly through a hole in the frame of the windscreen, the arm or link thus projecting into the interior of the vehicle. To enable the visor to be operated or angularly adjusted by the arm 10, the inner end of the latter is fitted with an eye 11 which is pivotally mounted on a horizontal pin 12, carried by, and projecting laterally from, an internally-threaded sleeve 13. This sleeve is mounted upon an obliquely-disposed screwed rod 14 which is rotatably mounted in bearings formed in supporting brackets projecting from, and carried by, a segmental plate 15 attached to the frame of the screen. The pin 12 carried by the sleeve 13 passes right through the eyed end of the arm 10 and engages a slot 16 in the plate, as shown in Figure 5, so that the sleeve is thus prevented from turning about the rod 14, although it may travel along the latter when the said rod is rotated. Fixed upon the outer end of the rod 14 is a head 17 by means of which the rod may be easily turned. Substantially the whole of the actuating mechanism is inside the vehicle at the rear of the windscreen, and the arrangement is such that when the head 17 is operated to rotate the screwed rod, the sleeve 13 is caused to travel along the latter, thereby moving the arm 10 outwards or inwards according to the direction of rotation. The visor or glare screen is thus turned about its hinged upper edge and may be readily adjusted from the inside of the vehicle into different angular positions. In order to steady the visor or glare screen and prevent vibration when the vehicle is in motion, an arm 10a is hinged to the opposite end of the visor and is provided with an eye 18 through which is passed a screw 19 working within a slot 20 in the plate 15a which is fixed to the adjacent end of the windscreen frame. The end of this screw is fitted with a cupped nut 21 housing a spring, the nut being adjusted so that the spring bears against the inner face of the plate 15a and, by the friction created, thus serves to steady the end of the visor to which the arm 10a is attached.

The ventilation opening is intended to be closed or varied by means of the rear panel 3, and in order to enable the latter to be retained in different angular positions, and also in its closed position, the segmental metal plates 15 and 15a fixed to the upper ends of the side standards of the screen project rearwardly in vertical planes so as to come one at either end of the rear panel 3, which is arranged to fit between them in the manner illustrated. The outer corners of the said rear panel are provided with spring-pressed balls 22, and these balls are arranged to be forced outwards by the springs and to engage one or other of a number of recesses 23 in the inner faces of the respective end plates 15 and 15a as the rear panel is opened or closed, the balls serving to retain the rear panel at different inclinations, and also when fully closed. The rear panel 3 is positively prevented from being moved down beyond its fully-open position, by coming into contact with the inwardly-projecting parts 13 and 21, constituting abutments for limiting the position of the panel 3 and forming part of the mechanism for operating the front panel. The rear panel 3 may be adjusted into different positions and retained in the position required by the balls 22 the arrangement enabling the size of the ventilation aperture to be readily varied, or completely closed, if desired. Any other suitable means may, however, be provided for adjustably holding the rear panel at different angles, or when fully closed, whilst other means may be provided for adjusting the front panel or glare-visor.

Instead of the rear panel being adjustable it may be fixed at a suitable angle to the vertical, and the ventilation opening controlled by moving the front panel or visor, which may, in this case, be arranged to move down close to the screen; or the front panel may be fixed and the rear panel only adjustable. It is obvious that the said front panel may be plain or transparent instead of coloured, if desired, or it may, on the other hand, consist of opaque material. The said front panel may be fixed or hinged to the front part of the roof of the vehicle, instead of being attached to the screen, whilst both panels may obviously be of any suitable width. The front panel, provided it is adjustable from the inside of the vehicle, may be applied to screens not having a rearwardly-inclined rear panel.

Having fully described our invention, what we desire to claim and secure by Letters Patent is:—

1. A vehicle windscreen comprising a frame, a panel at the lower part of the frame, a rearwardly-inclined panel, means for hingedly mounting the said rearwardly-inclined panel above the lower panel, a forwardly inclined panel, means for hingedly mounting the said forwardly-inclined panel at its upper edge upon the upper part of the frame, means for adjusting the inclination of the forwardly-inclined panel, spring catches for retaining the rearwardly-inclined panel in different angular positions, the said rearwardly and forwardly inclined panels being adapted to provide a ventilation opening between them and causes air to be directed upwardly into the vehicle.

2. A vehicle windscreen comprising a fixed frame, a lower panel, an upper panel of shallow depth compared with the lower panel hinged at its lower edge adjacent the upper edge of the lower panel and angularly movable into a position inclined upwardly and rearwardly from the lower panel, and also into a position completely closing the space above the lower panel, an abutment on the fixed frame behind the plane of the lower panel for preventing the rearward movement of the upper panel beyond a predetermined angular position inclined upwardly and rearwardly from the lower panel, and a third panel inclined forwardly and downwardly from its upper edge and disposed in front of the upper panel with its lower edge lower than the lower edge of said upper panel, the said upper and front panels being arranged to provide a ventilation opening between them so that the air passing through the opening is directed upwardly into the vehicle.

3. A vehicle windscreen comprising a fixed frame, a lower panel, an upper panel of shallow depth compared with the lower panel hinged at its lower edge adjacent the upper edge of the lower panel and angularly movable into a position inclined upwardly and rearwardly from the lower panel, and also into a position completely closing the space above the lower panel, an abutment on the fixed frame behind the plane of the lower panel for preventing the rearward movement of the upper panel beyond a predetermined angular position inclined upwardly and rearwardly from the lower panel, means for holding the said upper panel in a position closing the space above the lower panel and in different positions inclined upwardly and rearwardly from the lower panel, and a third panel inclined forwardly and downwardly from its upper edge and disposed in front of the upper panel with its lower edge lower than the lower edge of said upper panel, the said upper and front panels being arranged to provide a ventilation opening between them so that the air passing through the opening is directed upwardly into the vehicle.

4. A vehicle windscreen comprising a fixed frame, a lower panel and an upper panel of shallow depth compared with the lower panel hinged at its lower edge capable of a limited maximum angular movement into a position inclined upwardly and rearwardly from the lower panel, a hinged panel angularly movable into a position inclined forwardly from its upper edge and disposed in front of the upper panel and also into a position completely closing the space above the lower panel, means for holding the upper panel in a position closing the space above the lower panel and also in one or other of a plurality of positions inclined upwardly and rearwardly from the lower panel within the limited arc of movement, and means for holding the front panel at different inclinations, the said upper and front panels being arranged to provide a ventilation opening between them, so that the air passing through the opening is directed upwardly into the vehicle.

5. A vehicle windscreen comprising a fixed frame, a panel carried by the lower part of the frame and an upper panel of shallow depth compared with the lower panel hinged at its lower edge to the screen frame adjacent the upper edge of the lower panel and capable of a limited angular arc of movement into a position inclined upwardly and rearwardly from the said lower panel, an abutment carried by the frame rearwards of the plane of the lower panel for determining said limited arc of movement in combination with a front panel whose upper edge is hinged to the top of the screen frame higher than where said upper panel is hinged, said front panel being movable into a position inclined downwardly and forwardly therefrom, the said upper and front panels being separated to provide a ventilation opening between them so that air passing through the opening is directed upwardly into the vehicle, and means for fixing the said upper and front panels at a plurality of different angles from a vertical towards a horizontal position and for enabling them to be turned into parallel planes to lie close together one over the other and close the space above the lower panel.

6. A vehicle windscreen comprising side standards, a lower panel mounted between the lower portions of the side standards, an upper panel of shallow depth compared with the lower panel hingedly mounted above the lower panel so as to be capable of turning rearwardly about its lower edge and also in a position closing the space above the lower panel, rearwardly-extending vertical side plates carried by the upper parts of the side standards, a panel inclined forwardly and downwardly from its upper edge and disposed in front of the upper panel, abutments on the side plates adapted to cooperate with the upper panel to limit the rearward movement of said panel to a position inclined upwardly and rearwardly from the lower panel and means for holding the upper panel in a closed position in alignment with the lower panel, the said upper and forwardly-inclined panels being adapted to provide a ventilation opening between them so that air passing through the opening is directed upwardly into the vehicle.

7. A vehicle windscreen comprising side standards, a lower panel mounted between the lower portions of the side standards, an upper panel of shallow depth compared with the lower panel hingedly mounted above the lower panel so as to be capable of turning rearwardly about its lower edge and also in a position closing the space above the lower panel, rearwardly-extending vertical side plates carried by the upper parts of the side standards, and having arcuately-disposed spaced recesses in their opposed faces, abutments on the side plates adapted to co-operate with the upper panel to limit the rearward movement of said panel to a position inclined upwardly and rearwardly from the lower panel, a panel inclined forwardly and downwardly from its upper edge and disposed in front of the upper panel, and laterally-movable catch parts carried by the ends of the upper panel adapted to cooperate with the spaced recesses in the side plates to retain the said upper panel in different angular positions.

8. A vehicle windscreen comprising side standards comprising a fixed frame, a lower panel mounted between the lower portion of the fixed frame, an upper panel hingedly mounted above the lower panel so as to be capable of turning rearwardly about its lower edge, means for holding said upper panel in a position inclined upwards and rearwards from its lower edge, a front panel hinged at its upper edge upon the fixed frame and disposed in front of the upper panel, and means for operating the front panel from the interior of the vehicle so as to occupy various angular positions inclined downwards and forwards from its upper edge, the said means comprising an arm at one end of the said panel extending rearwards through a part of the fixed frame and past the end of the upper panel to the rear of the extreme rearward position of the latter and a manually operated screw device operatively connected to said arm to actuate the same.

9. A vehicle windscreen comprising a fixed frame, a lower panel mounted between the lower portion of the fixed frame an upper panel hingedly mounted above the lower panel so as to be capable of turning rearwardly about its lower edge, rearwardly-extending vertical side plates carried by the upper part of the fixed frame and having arcuately-disposed spaced recesses in their opposed faces, laterally-movable catch parts carried by the ends of the upper panel adapted to co-operate with the spaced recesses in the side plates to retain the said upper panel inclined upwards and rearwards from its lower edge in different angular positions, a front panel hinged at its upper edge upon the fixed frame and disposed in front of the upper panel, an arm at one end of the front panel extending rearwards through a part of a fixed frame and between a side plate and one end of the top panel, a rotatable screw mounted on the said side plate at the rear of the upper panel and constituting an abutment for limiting the movement of said upper panel, and a nut mounted upon the screw and slidably carried by the arm whereby the front panel may be moved independently of said upper panel and regardless of the position of said upper panel.

10. A vehicle windscreen comprising a fixed frame, a lower panel mounted between the lower portion of the fixed frame, an upper panel hingedly mounted above the lower panel so as to be capable of turning rearwardly about its lower edge, rearwardly-extending vertical side plates carried by the upper part of the fixed frame and having arcuately-disposed spaced recesses in their opposed faces, laterally-movable catch parts carried by the ends of the upper panel adapted to co-operate with the spaced recesses in the side plates to retain the said upper panel inclined upwards and rearwards from its lower edge in different angular positions, a front panel hinged at its upper edge upon the fixed-frame and disposed in front of the upper panel, an arm at one end of the front panel extending rearwards through a part of a fixed frame and between a side plate and one end of the top panel, a manually rotatable screw mounted on the said side plate at the rear of the upper panel, a nut mounted on the screw and constituting an abutment for limiting the movement of said upper panel, a lateral pin carried by the nut, an eye on the rear end of the arm engaged by the pin, and a slot in the side bracket slidably engaged by the pin.

11. A vehicle windscreen comprising a fixed frame, a lower panel mounted between the lower portion of the fixed frame, an upper panel hingedly mounted above the lower panel so as to be capable of turning rearwardly about its lower edge, rearwardly-extending vertical side plates carried by the upper part of the fixed frame and having arcuately-disposed spaced recesses in their opposed faces, laterally-movable catch parts carried by the ends of the upper panel adapted to co-operate with the spaced recesses in the side plates to retain the said upper panel inclined upwards and rearwards from its lower edge in different angular positions, a front panel hinged at its upper end upon the fixed frame and disposed in front of the upper panel, arms at opposite ends of the front panel extending rearwards through the fixed frame and between the side plates and the adjacent ends of the top panel, a screw device mounted upon one of the side plates behind the top panel and operatively connected to the arm at one side of the front panel in order to move the said panel into different angular positions, and a pin carried by the arm at the other end of the front panel, the side plate at this side of the windscreen having a guide slot engaged by the said pin.

In testimony whereof we affix our signatures.

PERCY LANE.
ARTHUR EDWARD LAIT.